United States Patent
Le Rouzic et al.

(10) Patent No.: US 9,276,671 B2
(45) Date of Patent: Mar. 1, 2016

(54) SYSTEM FOR DETERMINING A PROPAGATION TIME OF AN OPTICAL SIGNAL BETWEEN TWO OPTICAL DEVICES USING AN OPTICAL LINK

(75) Inventors: Esther Le Rouzic, Trébeurden (FR); Sebastien Jobert, Begard (FR); Nicolas Brochier, Ploumagoar (FR)

(73) Assignee: Orange, Paris (FR)

( * ) Notice: Subject to any disclaimer, the term of this patent is extended or adjusted under 35 U.S.C. 154(b) by 117 days.

(21) Appl. No.: 13/982,954

(22) PCT Filed: Jan. 27, 2012

(86) PCT No.: PCT/FR2012/050180
§ 371 (c)(1),
(2), (4) Date: Oct. 14, 2013

(87) PCT Pub. No.: WO2012/104528
PCT Pub. Date: Aug. 9, 2012

(65) Prior Publication Data
US 2014/0029933 A1   Jan. 30, 2014

(30) Foreign Application Priority Data
Jan. 31, 2011   (FR) ..................................... 11 50719

(51) Int. Cl.
| | | |
|---|---|---|
| H04B 10/08 | (2006.01) | |
| H04B 10/073 | (2013.01) | |
| H04B 10/071 | (2013.01) | |

(52) U.S. Cl.
CPC ............ *H04B 10/073* (2013.01); *H04B 10/071* (2013.01)

(58) Field of Classification Search
CPC ............. H04B 10/071; H04B 10/0777; H04B 10/07951; H04B 10/07955
See application file for complete search history.

(56) References Cited

U.S. PATENT DOCUMENTS

| 6,876,488 | B1 | 4/2005 | Akasaka | |
|---|---|---|---|---|
| 2005/0094936 | A1* | 5/2005 | Satomura et al. | 385/27 |
| 2005/0174563 | A1* | 8/2005 | Evans et al. | 356/73.1 |
| 2005/0226614 | A1 | 10/2005 | Ogiwara et al. | |
| 2007/0041006 | A1* | 2/2007 | Abbott | 356/73.1 |
| 2010/0142945 | A1* | 6/2010 | Shukunami et al. | 398/28 |

FOREIGN PATENT DOCUMENTS

| EP | 1758279 A1 | 2/2007 |
|---|---|---|
| FR | 2896644 A1 | 7/2007 |
| GB | 2416587 A | 2/2008 |

OTHER PUBLICATIONS

Bernard C. W. et al.: "Bidirectional Fiber Amplifiers", IEEE Photonics Technology Letters, IEEE Service Center, Piscataway, NJ, US, vol. 4, No. 8, Aug. 1, 1992, pp. 911-913, XP000293633.
International Search Report and Written Opinion dated Apr. 10, 2012 for corresponding International Application No. PCT/FR2012/050180, filed Jan. 27, 2012.
French Search Report and Written Opinion dated Sep. 8, 2011 or corresponding French Patent Application No. 1150719, filed Jan. 31, 2011.
International Preliminary Report on Patentability and English translation of the Written Opinion dated Aug. 6, 2013 for corresponding International Application No. PCT/FR2012/050180, filed Jan. 27, 2012.

* cited by examiner

*Primary Examiner* — Dzung Tran
(74) *Attorney, Agent, or Firm* — David D. Brush; Westman Champlin & Koehler, P.A.

(57) ABSTRACT

A system is provided for determining a propagation time of an optical signal between two devices in an optical transmission network. The first device is designed to determine the propagation time following the transmission of an optical measurement signal in a propagation direction towards a second device using an optical link while passing through an intermediate device, which includes at least one amplifier and one chromatic-dispersion compensation module that introduces a delay, and following the reception an optical return signal from the second device using the same optical link in a direction opposite to the propagation direction. The measurement system is configured to extract the return signal output by the intermediate device; regenerate the extracted return signal; feed the regenerated signal into the optical link, at the input of the intermediate device; and obtain a return signal-reception time while taking account the delay introduced by said compensation module.

8 Claims, 3 Drawing Sheets

SYSTEM FOR DETERMINING A PROPAGATION TIME OF AN OPTICAL SIGNAL BETWEEN TWO OPTICAL DEVICES USING AN OPTICAL LINK

CROSS-REFERENCE TO RELATED APPLICATIONS

This Application is a Section 371 National Stage Application of International Application No. PCT/FR2012/050180, filed Jan. 27, 2012, which is incorporated by reference in its entirety and published as WO 2012/104528 on Aug. 9, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention lies in the field of optical transmission systems, and more particularly in the field of determining a propagation time of an optical signal between two optical devices by means of an optical link.

BACKGROUND OF THE DISCLOSURE

In order to measure a propagation time of an optical signal between two optical devices connected by two distinct links, one for each transmission direction, it is known practice to measure an outgoing and incoming propagation time. An optical link consists of a succession of optical legs. An optical leg comprises notably an optical fiber. A measurement signal is sent by an optical device initiating the measurement to the adjacent optical device via the first optical link. The latter responds to the measurement signal to the initiating optical device via the second optical link. In an optical transmission network, when the respective lengths of the links of the two directions are not identical, the value of the propagation time estimated for each of the two links is contaminated with an error that is difficult to quantify.

In point of fact, many applications require a precise knowledge of this propagation time of an optical signal from one device to another. As an example, it is possible to cite methods of reserving resources or else methods of synchronizing optical devices.

In order to determine more precisely the propagation time of an optical signal on an optical link between two devices, there are methods, such as that described in patent FR 2896644, making it possible to reflect in the adjacent optical device a measurement signal transmitted by the device initiating the measurement over the optical link, optionally by means of other optical devices. The latter then receives a return signal on the same optical link and in the direction opposite to the propagation direction of the measurement signal. The initiating device can then determine the propagation time over the optical link. However, in certain cases, for example of long-distance links, amplification devices are provided between the two devices. An amplification device is used to amplify a signal received from the initiating device and sent to the adjacent device in the propagation direction. However, such an amplification device also plays a role of an isolator for the signals received in the direction opposite to the propagation direction on this optical link. Thus, when the method of patent FR 2896644 is implemented, the return signal is not transmitted beyond the last amplification device which is situated between the two devices, that is to say the first that the return signal encounters. In order to determine a propagation time on the optical link, it is then necessary to put in place notably measurements of a propagation time for each of the optical legs linking two amplification devices. Such a method is therefore complex to implement on an optical transmission network.

SUMMARY

According to a first aspect, the subject of the invention is a system for determining a propagation time of an optical signal, wherein a first device of the system comprises transmission means for transmitting an optical measurement signal in a propagation direction to a second device of the system by means of an optical link, reception means for receiving a return optical signal originating from the second device by means of said optical link in the direction opposite to the propagation direction and determination means for determining said propagation time based on a moment of transmission of the measurement signal and a moment of reception of the return signal, the optical signals transmitted by means of said optical link passing through at least one intermediate device comprising at least one amplifier, arranged to amplify optical signals received in the propagation direction.

The measurement system also comprises:
  first extraction means for extracting from the optical link the return signal, said first extraction means being situated at the output of said intermediate device;
  regeneration means for regenerating an optical signal, and injection means for injecting a regenerated optical signal onto the optical link, said injection means being placed at the input of said intermediate device,
the extracted return signal being regenerated by the regeneration means.

The return signal may correspond to the measurement signal in certain embodiments in which the loop is optical. In other embodiments in which the loop comprises an electronic processing, the return signal may correspond to a signal generated by the second device, optionally different from the signal in the outgoing direction.

The measurement signal may be a light pulse or else a data packet or else a data frame.

The regeneration means in the intermediate device comprise for example a reformatting module consisting of a receiver, of a reamplification and of a transmitter. The regeneration means may also comprise a filter centered on the wavelength used to transport the return signal.

The first device may therefore receive the return signal over the optical link by means of which it sent the measurement signal without being disrupted by the presence of intermediate devices comprising amplifiers, traversed by the optical signals transmitted from the first to the second device in the propagation direction. Since the return signal is received by means of the same optical link, the first device can then determine the propagation time over the optical link notably based on the moment of transmission of the measurement signal and the moment of reception of the return signal. It is not necessary to determine propagation times for each of the legs between two intermediate devices. This therefore makes it easier to measure the propagation time.

The invention therefore finds an advantageous application for determining an asymmetry between two optical links in the situation in which a first optical link is used for the transmission of the signals from the first to the second device and a second optical link, distinct from the first link, is used for the transmission of the optical signals from the second to the first device.

The determined propagation time may also be used during the implementation of methods of reserving resources in circuit-switching or else Optical Burst Switching (OBS) optical transmission networks.

Hereinafter, the intermediate device consists of a chain of elements comprising at least one amplifier connected to a chromatic-dispersion compensation module. It involves for example a first amplifier, connected to the compensation module, which is connected to a second amplifier. Hereinafter the description will be restricted to a type of compensation module introducing a delay.

In this embodiment, the system also comprises processing means, arranged to obtain a moment of reception of the return signal taking account of this delay introduced by the compensation module.

As an example, such a compensation module may be a chromatic-dispersion compensation module comprising a chromatic-dispersion compensation fiber. It has been observed that the length of this compensation fiber varies between modules specified to compensate for one and the same length of line fiber. As an example, measurements taken on four modules specified to compensate for 60 km of line fiber have made it possible to determine a maximum difference of 11 ps/nm which represents approximately 110 meters of uncertainty and 0.550 μseconds of difference assuming that the fibers in the compensation modules have a dispersion of 100 ps/nm/km. In the system described above, the return signal bypasses the intermediate device. In such a system, the measurement signal transmitted by the first device traverses the compensation module unlike the return signal. The presence of such a module in an intermediate device therefore disrupts the measurement of the propagation time. It is therefore necessary to take action on the sites of the intermediate devices to measure in advance the respective propagation times for each of the compensation modules that are present on the optical link, in addition to the measurements for each of the fiber legs between each intermediate device.

According to this embodiment of the invention and by virtue of the processing means of the system, it is possible to obtain a moment of reception of the return signal taking account of the delay or delays introduced by one or more chromatic-dispersion compensation modules, without taking action on the site of the intermediate device.

In a first variant of a second embodiment, the determination means in the first device and the subsequent means in the intermediate device form the means of processing:
- of the second extraction means for extracting from the optical link the measurement signal at the input of said intermediate device, said input signal being transmitted in the propagation direction;
- of the third extraction means for extracting from the optical link the measurement signal at the output of said intermediate device, said output signal being transmitted in the propagation direction;
- of the processing means for processing the extracted output signal, arranged to delay the extracted output signal, the extracted input signal and the output signal, once processed, also being regenerated by the regeneration means, and wherein the determination means are also arranged to obtain the delay introduced by the compensation module based on the input and output signals of the intermediate device.

For the variants of this second embodiment, the optical signal transmitted in the propagation direction is sampled at the input and at the output of the intermediate device. The signal sampled at the output is delayed by a fixed duration in order to prevent it being superposed on the signal sampled at the input.

The first device then receives a pair of optical signals for each intermediate device of the optical link to be measured, in addition to the return signal. This pair consists of a first signal corresponding to the signal sampled at the input of the intermediate device and of a second signal corresponding to the signal sampled at the output of the intermediate device. By taking account of the moments of receipt of all the pairs of optical signals and of the return signal, in addition to the delays of fixed duration introduced on the signals sampled at the output of the intermediate device, the first device can determine a propagation time between the two devices by means of the optical link. The determination of the propagation time is therefore easier to implement because it does not require taking action on the site of the intermediate device nor measuring the propagation time of the legs. Because of this it is possible to take this measurement without interrupting the routing of the traffic.

Here it is emphasized that the system may also comprise intermediate devices which do not include this type of compensation module. This second embodiment is compatible with such devices. However, it is possible to provide for such intermediate devices only the means described above and allowing the return signal not to be blocked by the intermediate device.

It is also emphasized that this second embodiment makes it possible to obtain propagation times for each of the elements of the link, that is to say the legs and the delay introduced by the compensation module.

According to a second variant of this second embodiment, the determination means in the first device and the subsequent means in the intermediate device form the means of processing:
- of the second extraction means for extracting from the optical link the measurement signal at the input of said compensation module of the intermediate device, said input signal being transmitted in the propagation direction;
- of the third extraction means for extracting from the optical link the measurement signal at the output of the intermediate device, said output signal being transmitted in the propagation direction;
- of the processing means for processing the output signal, arranged to delay the output signal;

the input signal and the optical signal, once processed, also being regenerated by the regeneration means, and wherein the determination means are also arranged to obtain the delay introduced by the compensation module based on the input and output signals of the intermediate device.

This is the particular situation of an intermediate device making it possible to sample a signal at the input of the compensation module. In this case, the signal sampled at the input of the compensation module can be attenuated before regeneration.

This variant has the additional advantage of allowing a lesser sampling of the signal, because it is carried out after a first amplification.

Optionally, it is provided before regeneration of the means for attenuating the input signal extracted by the second means.

According to a third embodiment, the determination means in the first device and the subsequent means in the intermediate device form the means of processing:

of the drop-and-insert means, arranged to reinject at the output of said intermediate device only the measurement signal, the optical signals other than the measurement signal being reinjected at the input of said intermediate device;

of the switching means for switching an optical signal transmitted in the propagation direction, placed at the input of said intermediate device, arranged to switch the optical signal at the input to the drop-and-insert means, and wherein the determination means are also arranged to implement a first measurement, control the switching means and implement a second measurement in order to determine the delay introduced by the compensation module.

This third embodiment requires the implementation of two measurement phases. In a first phase, the switching means are in nominal operating position, corresponding to the first embodiment. In a second phase, the switching means are in a position making it possible to route the measurement signal while avoiding traversing the intermediate device. Here it is emphasized that this position does not modify the routing of optical signals, other than the measurement signal, which still traverse the intermediate device. The traffic on the wavelengths other than that used for the measurement is not blocked to carry out the measurement. During this second phase, a second return signal is then transmitted from the second device. The first device can then determine a propagation time between the two devices based on the moment of reception of the return signal transmitted in nominal operating mode, of the moment of reception of the return signal transmitted when the measurement signal bypasses the intermediate device, and of the moments of transmission of the measurement signals. This third embodiment also has the advantages described above with respect to the first two embodiments.

As indicated above with respect to the second embodiment, the system can also comprise intermediate devices which do not include a compensation module of this type. This third embodiment is compatible with such devices. However, it is possible to provide for such intermediate devices only the means described above and allowing the return signal not to be blocked by the intermediate device.

According to a first variant of a fourth embodiment, since the intermediate device is also arranged to allow a passage of an optical signal only in the compensation module, this compensation module forms the processing means and the regeneration means consist of two stages:

a first stage regenerating the extracted return signal, a second stage regenerating an optical signal obtained after passage in said module of the output signal of the first stage.

In this fourth embodiment, the return signal traverses the compensation module so that it is delayed in the same way as the measurement signal. It is then possible to determine a propagation time based on the moments of transmission of the measurement signal and of reception of the return signal.

This fourth embodiment also has the general advantages described above with respect to the first two embodiments.

As indicated above with respect to the second embodiment, the system may also comprise intermediate devices which do not include a compensation module of this type. This fourth embodiment is compatible with such devices. However, it is possible to provide for such intermediate devices only the means described above and allowing the return signal not to be blocked by the intermediate device.

According to a second variant of this fourth embodiment, the regeneration means form part of another intermediate device provided for the transmission of an optical signal originating from the second device to the first device by means of another optical link distinct from said optical link.

This second variant makes it possible to reuse the existing means provided for the other optical link.

According to a second aspect, the invention relates to a drop-and-insert device, placed in an intermediate device of a system for determining a propagation time of an optical signal, wherein a first device of the system comprises transmission means for transmitting an optical measurement signal in a propagation direction to a second device of the system by means of an optical link, reception means for receiving a return optical signal originating from the second device by means of said optical link in the direction opposite to the propagation direction and determination means for determining said propagation time based on a moment of transmission of the measurement signal and a moment of reception of the return signal, the optical signals transmitted by means of said optical link passing through said intermediate device comprising at least one amplifier, arranged to amplify optical signals received in the propagation direction, and a chromatic-dispersion compensation module introducing a delay. The device comprises regeneration means for regenerating an optical signal, arranged to interact with the first means for extracting from the optical link the return signal at the output of said intermediate device, in order to regenerate the extracted return signal and to interact with means for injecting on the optical link at the input of said intermediate device the extracted and regenerated return signal, and means interacting with the determination means in order to obtain a moment of reception of the return signal taking account of said delay introduced by said compensation module.

According to a third aspect, the invention relates to a method for determining a propagation time of an optical signal, adapted according to the embodiment implemented in an intermediate device in a determination system according to the first aspect.

BRIEF DESCRIPTION OF THE DRAWINGS

The invention will be better understood with the aid of the following description of particular embodiments of the system of the invention, with reference to the appended drawings in which.

DETAILED DESCRIPTION OF ILLUSTRATIVE EMBODIMENTS

Figure 1:
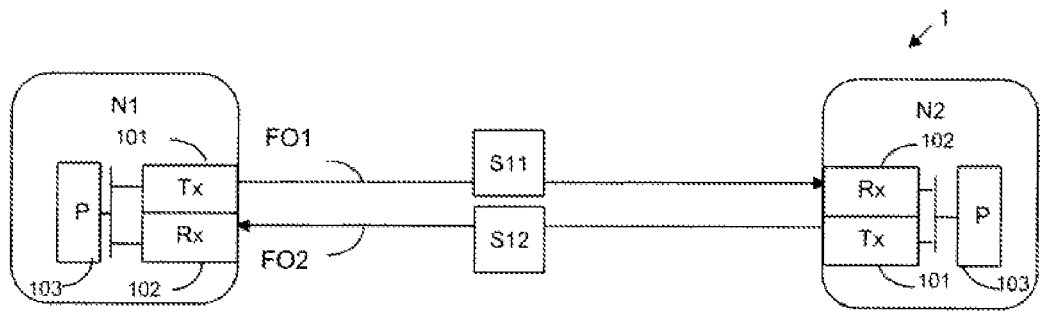
FIG. 1 represents two optical devices connected by means of two optical links.

FIG. 1 represents a system 1 for determining a propagation time of an optical signal in an optical transmission network. This system 1 comprises two optical devices N1, N2. An optical signal is transmitted from the first device N1 to the second device N2 by means of a first optical link FO1, consisting of optical fiber legs. Hereinafter, this first optical link is also called the first optical fiber. Another optical signal is transmitted from the second device N2 to the first device N1 by means of a second optical link FO2, consisting of optical fiber legs. Hereinafter, this second optical link is also called the second optical fiber. This second optical fiber FO2 is distinct from the first optical fiber FO1. Hereinafter, the description will be restricted to this particular case of two distinct optical fibers.

In a nominal operating mode, the two devices interchange optical signals by means of two optical fibers, one for each communication direction, also called propagation direction.

A first amplification site S11, comprising an intermediate device, is situated on the first optical fiber FO1 and is arranged to amplify signals received on the first optical fiber FO1 transmitted in the propagation direction from the first device N1 to the second device N2, by means, as appropriate, of other amplification sites.

A second amplification site S12 is situated on the second optical fiber FO2 and is arranged to amplify signals received on the second optical fiber FO2, in the opposite direction to the propagation direction, from the second device N2 to the first device N1, by means, as appropriate, of other amplification sites.

In order not to overload FIG. 1, only one amplification site is shown for each of the propagation directions of the optical signals. No limitation is attached to the number of amplification sites.

By convention, the signals before amplification are called the input signals and the signals once amplified are called output signals.

In order to determine a propagation time of an optical signal, the first device N1 transmits a measurement signal $Sig_M$ to the second device N2 on the first optical fiber FO1 and receives, by virtue of looping means, not shown in FIG. 1, a return signal $Sig_R$ transmitted by the second device on the first optical fiber in the opposite direction to the propagation direction. Since the return signal travels on the same optical fiber as the measurement signal, it is possible to determine the propagation time on this optical fiber based on a measurement of a duration between the moment of transmission of the measurement signal $Sig_M$ and the moment of reception of the return signal $Sig_R$. The propagation time thus determined is not contaminated by an error associated with the asymmetry of the optical fibers.

The description hereinafter relates to the context of a determination of a propagation time of an optical signal from the first device N1 to the second device N2.

The first device N1 comprises:
- a transmission module 101, associated with the first optical fiber FO1, arranged to transmit an optical signal by means of the first optical fiber FO1;
- a reception module 102, associated with the second optical fiber FO2, arranged to receive an optical signal by means of the second optical fiber FO2;
- a processing module 103.

In an equivalent manner, the second device N2 comprises:
- a reception module 102, associated with the first optical fiber FO1, arranged to receive an optical signal by means of the first optical fiber FO1;
- a transmission module 101, associated with the second optical fiber FO2, arranged to transmit an optical signal by means of the second optical fiber FO2;
- a processing module 103.

The first device N1 also comprises reception means, not shown in FIG. 1, arranged to receive on the first optical fiber FO1 the return signal from the second device. It may involve specific means or else means for redirecting signals received on the first optical fiber FO1 to the reception means 102. The second device N2 also comprises looping means, not shown in FIG. 1, arranged to transmit a return signal on reception of the measurement signal.

In a first implementation, the looping means may consist of optical elements only.

In order to determine a propagation time of an optical signal by means of the first optical fiber FO1 between the two devices N1, N2, the first device N1 transmits a request to measure a propagation time of a measurement signal by means of the first fiber FO1 to the second device N2, which acknowledges this request. If necessary, the second device N2 then configures the looping means to a second operating mode in which a return signal is injected into the first optical fiber FO1.

The first device N1 transmits the measurement signal $Sig_M$ by means of the first optical fiber FO1 to the second device N2 and stores the moment of transmission $t_e$. The measurement signal is then processed optically by the looping means of the second device N2 which inject into the first optical fiber FO1 a return signal $Sig_R$. The return signal is received by the first device N1 and the moment of reception $t_r$ is also stored. The return signal from the second device N2 corresponds to the measurement signal transmitted by the first device N1, attenuated if necessary. The first device N1 then determines the propagation time of the measurement signal $t_{FO1}$ based on the moments of transmission of the measurement signal and of reception of the return signal:

$$t_{FO1} = (t_r - t_e)/2$$

As nonlimiting examples of these looping means it is possible to cite:
- a reflection filter, such as a Bragg reflection network;
- a combination of an optical switch and a circulator. The optical switch is used in a first position to direct an optical signal received from the first device N1 on the first optical fiber FO1 to the reception module 102 of the second device N2 outside periods for measuring the propagation time of the first optical fiber FO1. In a second position, the optical switch transmits the optical signal received from the first device N1 to the circulator which transfers the signal into a loop and then transmits it to the optical switch. The latter reinjects it into the first optical fiber. Thus, in this second position of the switch, the looping means make it possible to reinject the received optical signal, the latter once reinjected becoming the return signal during the periods of measurement of the propagation time of the first optical fiber FO1;

this same combination supplemented by an amplifier;

an optical switch, an amplifier and a coupler. The coupler is placed on the first optical fiber FO1 to receive the optical signals from the first device N1 and transmit them to the optical switch and to inject into the first optical fiber FO1 an optical signal received from the amplifier. In a first position of the optical switch, an optical signal received on the first optical fiber FO1 by means of the coupler is transmitted to the reception module 102 of the second device N2. In a second position of the optical switch, an optical signal received on the first optical fiber FO1 by means of the coupler is transmitted to the amplifier. The amplifier amplifies the optical signal and transmits it to the coupler which injects it into the first optical fiber FO1 to the first device N1, the latter once injected becoming the return signal during the periods of measurement of the propagation time.

The measurement signal transmitted can for example consist of a light pulse or else a clock signal sent for a predetermined period, or else a particular modulation of a light signal, or else a predetermined frame or packet.

In a second implementation, the looping means may comprise an electronic processing contributing to the loop.

For this second case, the measurement signal may consist of a light pulse, or else a clock signal sent for a predetermined period, or else a particular modulation of the light signal, or else a frame or a packet that can be easily identified by the second device N2 as a frame or packet of measurement of propagation time. The return signal may consist of a frame or a packet indicating to the first device N1 the electronic processing time in the second device N2. It may also be identical to the measurement signal if the electronic processing time is transmitted by other means to the first device N1.

As a first example illustrating this type of looping means, the first and second devices comprise respectively an optical switch. In the first device N1, in a first operating mode, corresponding to a first position called the parallel position, the optical switch makes it possible to direct an optical signal transmitted by the transmission module 101 from the first device N1 to the second device N2 on the first optical fiber FO1 and an optical signal received from the second device N2 on the second optical fiber FO2 to the reception module 102 of the first device N1. In a second operating mode, corresponding to a second position called the crossed position, the optical switch makes it possible to direct an optical signal transmitted by the transmission module 101 of the first device N1 to the second device N2 on the second optical fiber FO2 and an optical signal received from the second device N2 on the first optical fiber FO1 to the reception module 102 of the first device N1. In the second device N2, in the parallel position, the optical switch makes it possible to direct an optical signal received on the first optical fiber FO1 to the reception module 102 of the second device N2 and an optical signal received from the transmission module 101 of the second device N2 to the first device N1 on the second optical fiber FO2. In the crossed position, the optical switch transmits an optical signal received on the second optical fiber FO2 to the reception module 102 of the second device N2 and transmits an optical signal received from the transmission module 101 of the second device N2 to the first device N1 by means of the first optical fiber FO1. The optical switches of the first and second devices are initially set in the parallel position.

The first device N1 transmits a request to measure the propagation time of a measurement signal by means of the first fiber FO1 to the second device N2 which acknowledges it. The first device N1 then transmits the measurement signal $Sig_M$ by means of the first optical fiber FO1, stores the moment of transmission $t_e$ and configures, immediately after the transmission of the measurement signal, the means necessary for the reception of the return signal, that is to say the optical switch in the crossed position. The second device N2 receives the measurement signal $Sig_M$, stores the moment of reception of the measurement signal $Sig_M$ in order to determine the internal electronic processing time and then configures the optical switch in the crossed position when the measurement signal is received. The internal processing time is determined by the second device N2. This internal processing time $t_{int}$ takes account of the time necessary to configure the optical switch. The second device N2 transmits the return signal $Sig_R$, the latter comprising the determined internal processing time $t_{int}$. The internal processing time may also be transmitted in a second, subsequent response message. The moment of reception $t_r$ of the return signal is stored by the first device N1.

The first device N1 then determines the propagation time $t_{FO1}$ of the measurement signal based on the moments of transmission of the measurement signal, of reception of the return signal and of the processing time internal to the second device N2:

$$t_{FO1}=(t_r t_e-t_{int})/2$$

After this measurement, the first and second devices reconfigure their respective optical switches in the parallel position.

The second embodiment may advantageously be implemented by using the messages defined by the PTP protocol. The PTP "Peer_Delay_Request" message is then the measurement signal transmitted by the first device N1 and the PTP "Peer_Delay_Response" message the return signal. If the internal processing time is transmitted independently of the return signal, it is possible to also use the PTP "Peer_Delay_Response_Follow_up" message. These signals used for the measurement are responsible for transporting the timestamps necessary to indicate the electronic processing time to the first device N1.

As a second example illustrating this type of looping means, instead of the optical switch, the first device N1 comprises looping means comprising an optical switch, an isolator and a coupler. The optical switch makes it possible to have the transmission module 101 send to the second fiber FO2 during the measurement period. The isolator makes it possible to prevent the measurement signal in the outward direction from being received by the transmission module 101 during the measurement period. A variable attenuator is placed between the first and second optical fibers and is used to ensure that, outside the measurement periods, the backscattered signal of the first fiber FO1 does not disrupt the reception module 102 of the first device N1. In an equivalent manner, the second device N2 comprises looping means comprising an optical switch, an isolator and a coupler. The optical switch makes it possible to have the transmission module 101 send to the first fiber FO1 during the measurement period. The isolator makes it possible to prevent the measurement signal, in the outgoing direction, from being received by the transmission module 101 during the measurement period. A variable attenuator is placed between the first and second optical fibers and makes it possible to ensure that, outside the measurement periods, the signal sent by the transmission module 101 does not disrupt the reception module 102 of the first device N1.

When a measurement of a propagation time on the first optical fiber FO1 is initiated by the first device N1, the attenuator of the first device N1 opens the optical connection between the first optical fiber FO1 and the reception module 102 of the first device N1 and the optical switch of the second device N2 is set so that the transmission module 101 of the second device N2 transmits to the first optical fiber FO1. During the measurement on the first optical fiber FO1, the attenuator of the second device N2 remains in closed position, and the optical switch of the first device N1 in normal position, connected to the first optical fiber FO1. The first device N1 sends the measurement signal $Sig_M$ to the second device N2. This measurement signal is received by the second device N2 and is processed electronically with a delay that is variable, but that is measured precisely by the second device N2. The second device N2 sends back to the first device N1 on the first optical fiber FO1 the return signal $Sig_R$ indicating the measurement of the internal processing time $t_{int}$ by means of the optical switch of the second device N2 previously set to transmit to the first optical fiber FO1 and the optical coupler. This return signal is received by the first device N1, by means of the attenuator of the first device N1 now open and the optical couplers. The first device N1 can then determine the propagation time on the first optical fiber FO1.

Figure 2:
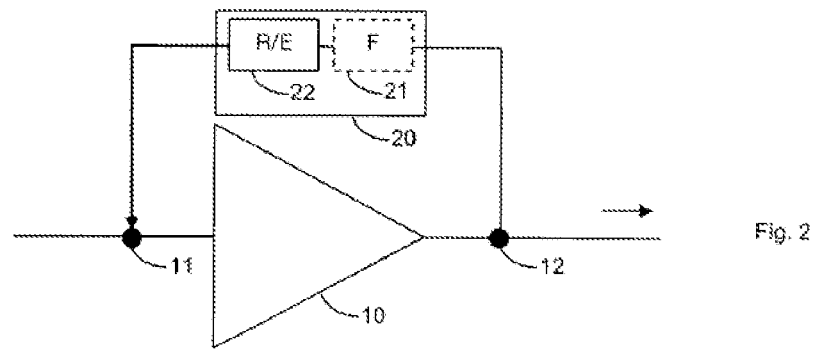
FIG. 2 represents a portion of a determination system according to a first particular embodiment of the invention.

FIG. 2 shows a part of the determination system 1 according to a first particular embodiment of the invention. An amplifier 10 amplifies the optical signals transmitted by means of the optical fiber FO1 in the propagation direction. This amplifier 10 corresponds to an intermediate device.

A first coupler 11 is placed at the input of the amplifier 10 and is used to inject an optical signal into the optical fiber in the opposite direction from the propagation direction.

A second coupler 12 is placed at the output of the amplifier 10 and is used to extract from the optical fiber FO1 an optical signal transmitted in the opposite direction to the propagation direction. This optical signal corresponds to the return signal.

The system 1 comprises regeneration means, more precisely a reformatting module 22 consisting of a receiver, an amplifier and a transmitter. In one particular embodiment, as shown in FIG. 2, these regeneration means are provided in a drop-and-insert device 20. These means may also be incorporated into the intermediate device.

Optionally, the drop-and-insert device 20 also comprises a filter 21 centered on the wavelength transporting the return signal. This filter makes it possible to eliminate all the other wavelengths transported by the optical fiber.

The second coupler 12 therefore extracts the return signal when it is transmitted and directs it to the drop-and-insert device 20. The latter regenerates it and the regenerated return signal is reinjected by the first coupler 11 into the optical fiber in the opposite direction to the propagation direction. Thus, the return signal is not blocked by the amplifier 10.

In the second, third and fourth embodiments, the intermediate device 30 comprises a first amplifier 31, followed by a chromatic-dispersion compensation module 32 and a second amplifier 33. For all of these embodiments, the system 1 comprises means making it possible to prevent the return signal from being blocked in the intermediate device. The compensation module 32 introduces a delay when the measurement signal traverses it. For these embodiments, the system comprises processing means, arranged to obtain a moment of reception of the return signal taking into account a delay introduced by the compensation module 32.

In the second embodiment, the measurement signal is sampled at the input and output of the intermediate device in the propagation direction and the sampled signals are sent back to the first device N1. The first device N1 then determines the delay introduced by the compensation module 32 and can correct the moment of reception of the return signal.

Figure 3A:
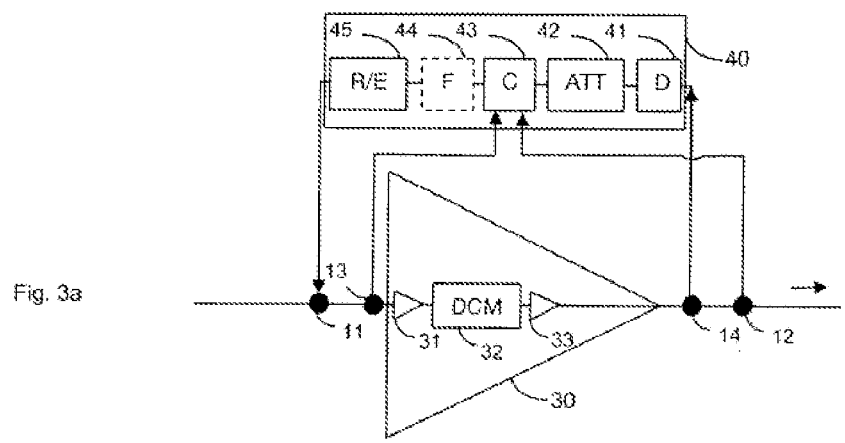
FIG. 3a represents a portion of a determination system according to a first variant of a second particular embodiment of the invention.

FIG. 3a represents a part of the determination system according to a first variant of the second particular embodiment of the invention.

The couplers 11 and 12 have the same features as those described above with respect to FIG. 2.

A coupler 13 is placed at the input of the intermediate device and is arranged to sample from the optical fiber an optical signal transmitted in the propagation direction. So as not to disrupt the performance of the transmission network, only a minimal part of the optical signal is sampled. Since this coupler 13 is placed before amplification, it is possible for example to sample in the order of 10% of the input signal.

A coupler 14 is placed at the output of the intermediate device and is arranged to sample from the optical fiber an optical signal transmitted in the propagation direction. So as not to disrupt the performance of the transmission network, only a minimal part of the optical signal is sampled. Since this coupler 14 is placed after amplification, it is possible for example to sample of the order of 1% of the output signal.

The system 1, and more precisely a drop-and-insert device 40, comprises:
- a delaying module 41, arranged to introduce a delay LR to an optical signal;
- an attenuator 42, arranged to attenuate an optical signal transmitted by the delaying module 41;
- an optional filter 44, similar to the filter 21 described with respect to FIG. 2;
- a reformatting module 45, similar to the module 22 described with respect to FIG. 2;
- a coupler 43, comprising three inputs and connected at the output to the filter 44 or to the reformatting module 45 if necessary.

These means may also be incorporated into the intermediate device.

The reformatting module 45 and the filter 44 as appropriate form the regeneration means.

The delaying module 41 is connected to the coupler 14 and therefore delays the extracted output signal. This makes it possible to ensure that the optical signals at the input and output of the intermediate device do not collide.

The three inputs of the coupler 43 are connected to the output of the coupler 13, to the output of the coupler 12 and to the output of the attenuator 42.

The attenuator 42 makes it possible to adjust the level of the optical signal at the output, since this signal has been amplified successively by the first amplifier 31 and the second amplifier 32.

In the measurement phase, three optical signals are therefore retransmitted to the first device N1:
- the measurement signal sampled at the input, regenerated by the reformatting module 45;
- the measurement signal sampled at the output, delayed by the delaying module 41 and regenerated by the reformatting module 45;
- the return signal sampled at the output of the intermediate device in the opposite direction to the propagation direction, regenerated by the reformatting module 45.

The processing module 103 then determines the delay introduced by the compensation module based on the signals sampled at the input and at the output of the intermediate device.

Thus, in this second embodiment, the processing module 103 and the drop-and-insert device 40 interact to obtain a moment of reception of the return signal taking account of the delay introduced by the compensation module.

Figure 3B:
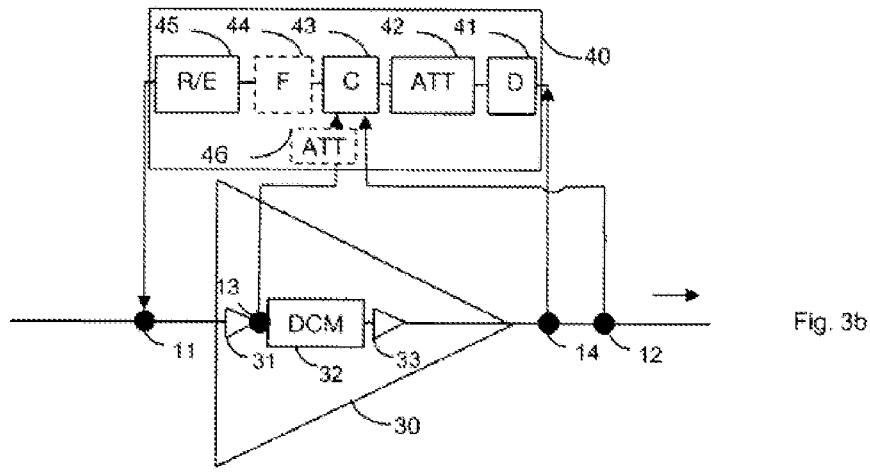
FIG. 3b represents a portion of a determination system according to a second variant of the second particular embodiment of the invention.

The second variant of this second embodiment, shown in FIG. 3b, is designed to operate with an intermediate device 30 providing an access to the optical signal at the output of the first amplifier 31. This makes it possible to simplify the readjustment of the transmission parameters of the link. The coupler 13 is placed in this case at the output of the first amplifier 31 and can for example sample of the order of 1% of the optical signal.

The drop-and-insert device 40 may comprise in addition to the elements already described with respect to FIG. 3a, an attenuator 46 making it possible to adjust the level of the optical signal at the input of the reformatting module 45.

It is emphasized here that when the return signal is transmitted on a wavelength that is different from that used for the measurement signal, the filter 44 is adapted according to these two wavelengths.

Figure 6:
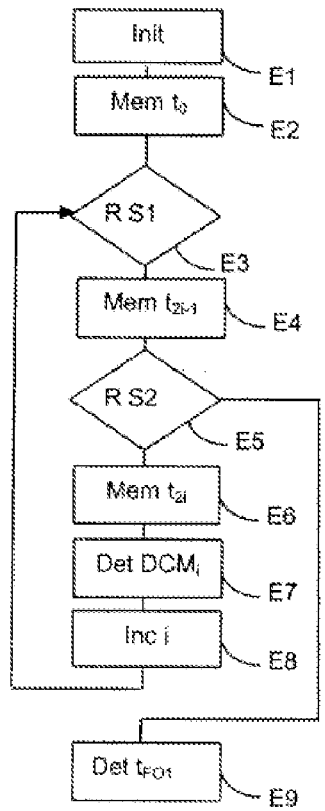
FIG. 6 represents the steps of a method for determining a propagation time implemented in a determination system according to the second particular embodiment of the invention.

FIG. 6 represents the steps of a method for determining a propagation time implemented in a system comprising at least one drop-and-insert device 40 according to the second particular embodiment of the invention. The system may also comprise one or more drop-and-insert devices 20 according to the first embodiment. It is emphasized here that the steps described above with respect to the looping means, notably the steps for controlling the looping means, are not described again but form part of the method.

The first device N1 stores by configuration all of the delays LR introduced by the drop-and-insert device(s) 40 according to the second embodiment. Hereinafter $LR_k$ denotes the delay of fixed duration provided by the drop-and-insert device 40 placed on the site $S_k$.

In a step E1 of initialization, a variable i is set to the value one.

In a step E2, the first device N1 transmits the measurement signal $Sig_M$ and stores the moment $t_0$ of its transmission.

In a step E3, the first device N1 verifies whether it has received a first optical signal. If it has, in a step E4, the first device N1 stores the moment of reception $t_{2i-1}$ of this first optical signal. This involves the measurement signal sampled at the input of the intermediate device of the site $S_i$.

A second signal is received in a step E5. This wait can be supervised by a timer. It involves the measurement signal sampled at the output of the intermediate device, delayed by the delay $LR_i$. In a step E6, the first device N1 stores the moment of reception $t_{2i}$ of the measurement signal sampled at the output of the intermediate device of the site $S_i$.

In a step E7, the first device determines, based on the moments of reception $t_{2i-1}$, $t_{2i}$ and the delay $LR_i$ a duration corresponding to the delay $DCM_i$ introduced by the chromatic-dispersion compensation module of the intermediate device of the site $S_i$. More precisely, $DCM_i = t_{2i} - LR_i - t_{2i-1}$.

In a step E8, the variable i is incremented by one.

Then the first device N1 returns to the step E3 awaiting reception of the first signal.

When no signal is received in step E5, the last signal received corresponds to the return signal $Sig_R$. The return signal looped at the second device N2 has been dropped and inserted at the various intermediate devices 30, 40 that are present on the optical link between the first and second devices. The last reception moment stored then corresponds to the reception moment $t_R$ of the return signal.

In a step E9, the first device N1 determines the propagation time between the first and second devices by means of the optical fiber FO1:

$$t_{FO1} = (t_R - t_0)/2 + \Sigma DCM_i$$

This propagation time is optionally corrected by the internal processing time $t_{int}$.

It is emphasized here that the various reception moments stored also make it possible to determine a propagation time between two intermediate devices based on the moment of reception of the output signal from the intermediate device of the site $S_i$ and on the moment of reception of the input signal of the intermediate device of the site $S_{i+1}$.

Figure 4:
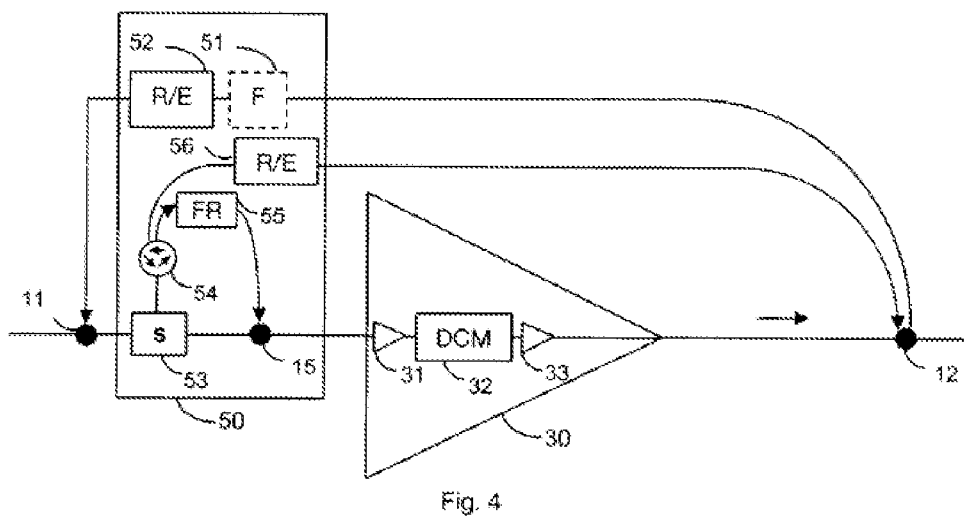
FIG. 4 represents a portion of a determination system according to a third particular embodiment of the invention.

In the third embodiment, the measurement is taken in two distinct measurement phases: in a first phase, the measurement signal passes through the intermediate device 40 and, in a second phase, the measurement signal bypasses the intermediate device. Two return signals are thus received by the first device N1. The first device N1 then determines the delay introduced by all of the chromatic-dispersion compensation modules 32 and can correct the moment of reception of the return signal. FIG. 4 represents a portion of a system 1 in its environment according to the third particular embodiment of the invention.

The coupler 11 has the same features as that described above with respect to FIG. 2.

The coupler 12 has the same features as that described above with respect to FIG. 2 and also makes it possible to inject an optical signal into the optical fiber in the propagation direction.

The system 1, and more precisely a drop-and-insert device 50, comprises:
- an optional filter 51, similar to the filter 21 described with respect to FIG. 2;
- a reformatting module 52, similar to the reformatting module 22 described with respect to FIG. 2;
- a switch 53, arranged so that, in a first position, it transmits an optical signal transmitted in the propagation direction to the intermediate device 30 and, in a second position, it switches an input optical signal to an optical circulator 54;
- the circulator 54;
- a reflection filter 55, designed to reflect the wavelength on which the measurement signal is transmitted to the circulator 54 and to transmit the optical signals other than the measurement signal to a coupler 15;
- a reformatting module 56 connected to the circulator 54, arranged to receive the reflected measurement signal from the circulator 54, amplify it and transmit it to the coupler 12, at the output of the intermediate device;
- the coupler 15, arranged to reinject an optical signal received in the propagation direction from the optical fiber.

These means may also be incorporated into the intermediate device.

The reformatting module 51, and the filter 52 if necessary, form the regeneration means.

The reflection filter 55 is for example a Bragg reflection network. An example of such a filter is described in the article entitled "First tunable narrowband 1.55 μm optical drop filter using a dynamic photorefractive grating in iron doped indium phosphide" by D. Hervé et al. published in 1994 in the review "Electronics Letters". Such a filter can be very fine, a few tenths of nm and reflect more than 99%. This third embodiment is completely static if the filter operates only on a fixed wavelength for the measurement signal.

The switch 53 is designed to switch between the two positions on command from the first device N1.

The circulator 54, the reflection filter 55 and the coupler 15 form means for dropping and inserting the input measurement signal, which means being placed at the input of the intermediate device 30 and arranged to reinject at the output of the intermediate device 30 only the measurement signal, the optical signals other than the measurement signal being reinjected at the input of the intermediate device 30.

During the first measurement phase, the switch 53 is in the first position and the first device N1 receives a first return signal transmitted based on a measurement signal that has traversed the compensation module 32. In the second measurement phase, on command from the processing module 103, the switch 53 is in the second position and the first device N1 receives a second return signal transmitted based on a measurement signal that has bypassed the compensation module 32.

The processing module 103 then determines the delay introduced by the compensation module based on the moments of transmission of the first and second measurement signals and on the moments of reception of the first and second return signals.

Thus, in this third embodiment, the processing module 103 and the drop-and-insert device 50 interact to obtain a moment of reception of the return signal taking account of the delay introduced by the compensation module.

Figure 7:
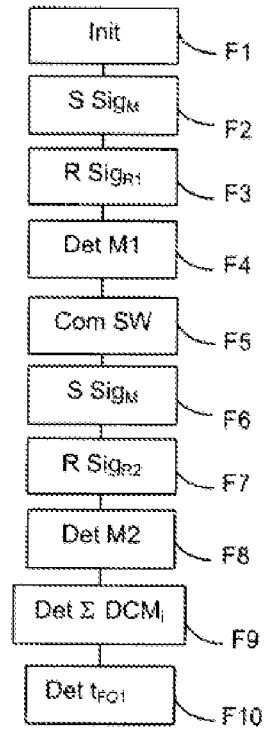
FIG. 7 represents the steps of a method for determining a propagation time implemented in a determination system according to the third particular embodiment of the invention.

FIG. 7 represents the steps of a method for determining a propagation time implemented in a system comprising at least one drop-and-insert device 50 according to the third particular embodiment of the invention. The system may also comprise one or more drop-and-insert devices 20 according to the first embodiment. It is emphasized here that the steps described above with respect to the looping means, notably for controlling the looping means, are not described again but form part of the method.

In an initialization step F1, the variables of the method are initialized. The switch 53 is in the first position.

In a step F2, the first device N1 initiates the first measurement phase and transmits the measurement signal. It also stores the moment $t_{e1}$ of transmission of the latter.

In a step F3, the first device N1 receives a first return signal $Sig_{R1}$ and stores the moment $t_{R1}$ of reception of the latter. The return signal looped at the second device N2 has been dropped and inserted at the various intermediate devices 30, 50 that are present on the optical link between the first and second devices.

In a step F4, the first device N1 determines a first value M1, equal to $t_{R1}-t_{e1}$. This terminates the first measurement phase. This first value M1 corresponds to twice the propagation time on the optical fiber increased by the delay or delays of the compensation modules that are present on the optical fiber.

In a step F5, the first device N1 initiates the second measurement phase and commands the switching of the switch 53 to the second position.

In a step F6, the first device N1 transmits the measurement signal. It also stores the moment $t_{e2}$ of transmission of the latter.

In a step F7, the first device N1 receives a second return signal $Sig_{R2}$ and stores the moment $t_{R2}$ of reception of the latter. As a reminder, the measurement signal has bypassed the compensation module 32. The return signal looped at the second device N2 has been dropped and inserted at the various intermediate devices 30, 50 that are present on the optical link between the first and second devices.

In a step F8, the first device N1 determines a second value M2 equal to $t_{R2}-t_{e2}$. This terminates the second phase. This second value M2 corresponds to twice the propagation time on the optical fiber.

In a step F9, the first device commands the switching of the switch 53 to the first position and then determines the total value of the delay or delays introduced by the compensation modules that are present on the optical fiber based on the first and second measured values. More precisely, $\Sigma DCM_i = M1 - M2$.

In a step F10, the first device then determines the propagation time between the first and second devices by means of the optical fiber FO1:

$$t_{FO1} = (t_{R1} + \Sigma DCM_i - t_{e1})/2$$

This propagation time is optionally corrected by the internal processing time $t_{int}$.

The fourth embodiment is particularly suited to the situation in which the intermediate device 30 is arranged to allow a passage of an optical signal only in the compensation module 32. Accordingly, the intermediate device 30 comprises a first circulator 34 situated between the first amplifier 31 and the compensation module 32, and a second circulator 35 situated between the compensation module 32 and the second amplifier 33. The first and second circulators 34 and 35 make it possible to dissociate the optical signals of the two propagation directions traversing the compensation module 32. In this fourth embodiment, the return signal traverses the compensation module 32.

Figure 5A:
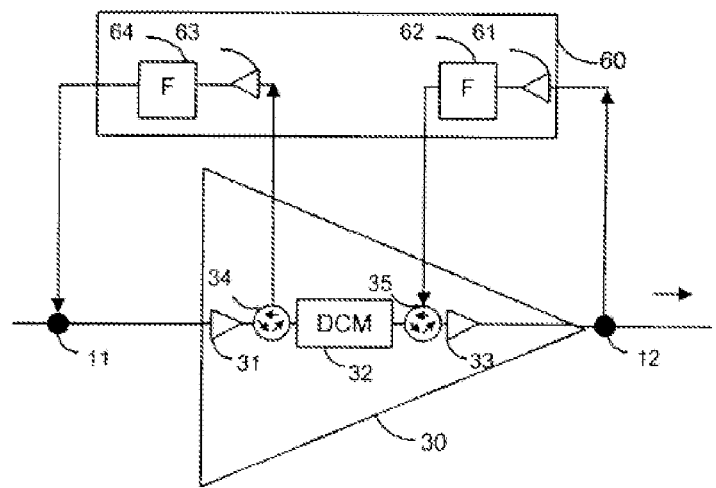
FIG. 5a represents a portion of a determination system according to a first variant of a fourth particular embodiment of the invention.

FIG. 5a represents a drop-and-insert device 60 in its environment according to a first variant of the third particular embodiment of the invention.

The couplers 11 and 12 have the same features as those described above with respect to FIG. 2.

The system 1, and more precisely a drop-and-insert device 60, comprises:
  a first stage, consisting of an amplifier 61 and a filter 62 regenerating the return signal extracted by the coupler 12;
  a second stage, consisting of an amplifier 63 and a filter 64 regenerating an optical signal obtained from the circulator 34.

These means may also be incorporated into the intermediate device.

The first and second stages form the regeneration means.

At the output of the first stage, the optical signal is injected into the circulator 35 of the intermediate device 30. The signal at the output of the circulator 34, that is to say the signal at the output of the first stage after passage in the compensation module 32, is injected at the input of the second stage.

The amplifiers 61 and 63 are for example semiconductor optical amplifiers (SOA) and make it possible to ensure that the return signal has sufficient power to be processed by the compensation module 32. The filters 62 and 64 make it possible to ensure that only the measurement wavelength is returned in the direction opposite to the propagation direction.

Thus, in this fourth embodiment, the drop-and-insert device 60 processes the return signal so that the moment of reception of the return signal at the first device N1 takes account of the delay introduced by the compensation module 32.

Figure 5B:
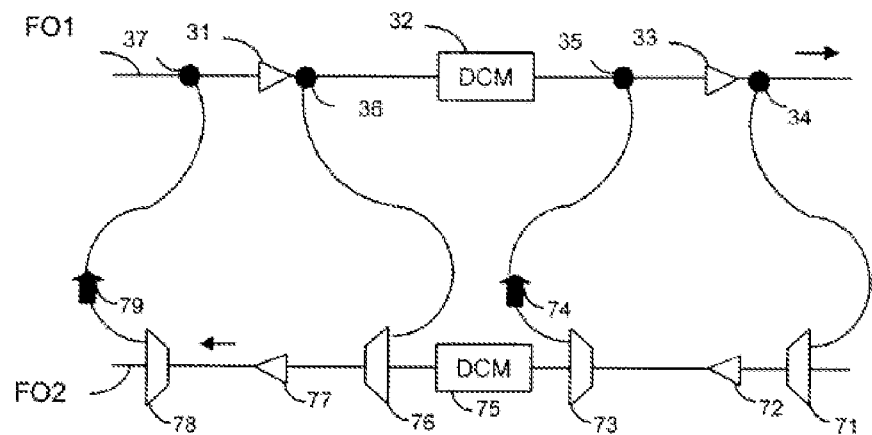
FIG. 5b represents a portion of a determination system according to a second variant of the fourth particular embodiment of the invention.

A second variant of this fourth embodiment is shown in FIG. 5b. This FIG. 5b shows a second optical fiber FO2 provided for the transmission from the second device N2 to the first device N1. An intermediate device, consisting of a first amplifier 72, a compensation module 75 and a second amplifier 77, is shown on this second optical fiber. According to the invention, a first multiplexer 71 used to insert a wavelength of the measurement signal and a first demultiplexer 73 used to extract the wavelength of the measurement signal are provided respectively at the input and the output of the first amplifier 72. Similarly, a second multiplexer 76 and a second demultiplexer 78 are provided at the input and output of the second amplifier 77. A first coupler 34 placed on the first optical fiber FO1 samples the return signal transmitted on the latter and transmits it to the input of the first multiplexer 71.

The return signal is then amplified by the first amplifier 72. At the output of the latter, the first demultiplexer 73 transmits the amplified return signal at the input of the compensation module 32 by means of an isolator 74 and a coupler 35 placed on the first optical fiber FO1. Once processed by the compensation module 32, a coupler 36 placed at the output of the latter samples the return signal and transmits it to the input of the second multiplexer 76. The return signal is then amplified by the second amplifier 77. The second demultiplexer 78 transmits the amplified return signal to the first optical fiber FO1 by means of an isolator 79 and a coupler 37.

Thus, in this second variant, use is made of the regeneration means that are present in the intermediate device available on the second optical fiber FO2.

For these two variants, the processing module 103 then determines the propagation time between the first and second devices by means of the optical fiber FO1 based on the moment $t_0$ of transmission of the measurement signal and the moment $t_R$ of reception of the return signal. More precisely, this case gives $t_{FO1}=(t_R-t_0)/2$, corrected as appropriate by the internal processing time $t_{int}$, as described above in the absence of a compensation module.

The method for determining a propagation time, as described above, finds a particularly advantageous application for determining an asymmetry of two optical fibers. The first device N1 determines a first propagation time $t_{FO1}$ of an optical signal by means of the first optical fiber FO1 by the implementation of the method for determining a propagation time as described above by interacting with the second device N2 and transmits this first propagation time to the second device N2. The second device N2 determines a second propagation time $t_{FO2}$ of an optical signal by means of the second optical fiber FO2 by the implementation of the method for determining a propagation time as described above by interacting with the first device N1 and transmits this second propagation time to the first device N1. The first device N1 determines an asymmetry between the two optical fibers. Alternatively, it is also possible to determine the propagation time of the measurement signal on the first fiber, then the outgoing time of the measurement signal on the first fiber and the return time of the return signal on the second fiber, in order to deduce therefrom the propagation time on the second fiber. Once the asymmetry is determined, the first device N1 can thus correct the PTP messages received subsequently in order to compensate for this asymmetry, as described in section 11.6 of the standard IEEE 1588-2008.

For the various embodiments, with the exception of the second variant of the fourth embodiment corresponding to FIG. 5b, the measurement signal can be carried by a channel used to route the user traffic outside the measurement period. It may for example involve a non WDM optical link transporting traffic, or else, in the case of a WDM system, it may involve a wavelength used also to transport traffic. In this case, the measurement cannot be taken when the traffic is transported in the channel, because the transmission of the return signal on the first optical fiber disrupts the transmission of the user traffic on the first and second fibers. It is therefore necessary to block the user traffic on this channel during the measurement of the propagation time.

In the case of WDM, the operation of the other wavelengths is not disrupted.

It is also possible to use a transmission channel dedicated to the measurement. It may for example involve a wavelength dedicated for transporting the measurement signal. The selected wavelength must traverse all the elements that contribute to the propagation time.

It is emphasized here that, when the measurement of the propagation time is taken on a dedicated wavelength, it is possible to deduce the propagation time on the other payload wavelengths transporting user data. However, because of the chromatic dispersion, the delays on the various wavelengths are not exactly the same. This difference may be greater or lesser according to the distance. For example, it is possible to have up to 40 nanoseconds of uncertainty on 80 kilometers of noncompensated link due to the chromatic dispersion for 30 nanometers of wavelength difference. This difference may reach 80 nanometers between the C and L bands. In this case, it can be seen that the difference is not negligible relative to the precision objectives. In order to correct this error due to the chromatic dispersion, it is possible to automatically compensate by computing the difference in measurement of propagation time between the wavelength used for the measurement and each payload wavelength based on the knowledge of each wavelength and the distance of the link, which is known fairly precisely by virtue of the measurement of the propagation time. Several models are possible for carrying out this computation (see for example Govind P. Agrawal, "Nonlinear Fiber Optics", Academic Press, 1989). It is however important that the values of the dispersion per wavelength are stored in the devices.

Moreover, when the measurement of the propagation time is taken on a dedicated wavelength, it is possible to use different wavelengths in the outgoing and incoming directions. This situation may be considered as a case in which the signals are different in the outgoing and incoming directions. It is appropriate in this case to take account of and compensate for the effects of the chromatic dispersion.

The processing module 103 of the first device N1 is arranged to implement the steps of the method for determining a propagation time described above that are executed by the device. Preferably it involves software modules comprising software instructions for executing the steps of the method for determining a propagation time described above, which are implemented by an optical device. The invention therefore also relates to: 1a program for a device, comprising program instructions designed to command the execution of the steps of the method for determining a propagation time described above which are executed by said device, when said program is executed by a processor of the latter;

a recording medium that can be read by a device on which the program for a device is recorded.

The software modules may be stored in or transmitted by a data medium. The latter may be a hardware storage medium, for example a CD-ROM, a magnetic diskette or a hard disk, or else a transmission medium such as an electrical, optical or radio signal, or a telecommunications network.

The invention claimed is:

1. A system for determining a propagation time of an optical signal, the system comprising:

a first device comprising transmission means for transmitting an optical measurement signal in a propagation direction to a second device of the system by a single optical link, reception means for receiving a return optical signal originating from the second device by said single optical link in a direction opposite to the propagation direction and determination means for determining said propagation time based on a moment of transmission of the measurement signal and a moment of reception of the return optical signal;

at least one intermediate device, through which the optical measurement signal transmitted along said single optical link passes through, said intermediate device comprising at least one amplifier, arranged to amplify optical measurement signals received in the propagation direction, and a chromatic-dispersion compensation module introducing a delay;

first extraction means for extracting from the single optical link the return optical signal, said first extraction means being situated at an output of said intermediate device;

regeneration means for regenerating the extracted return optical signal, injection means for injecting the extracted and regenerated return optical signal onto the single optical link in the opposite direction from the propagation direction, said injection means being placed at an input of said intermediate device, processing means, arranged to obtain a moment of reception of the extracted and regenerated return optical signal taking account of said delay introduced by said compensation module.

2. The system for determining a propagation time as claimed in claim 1, wherein the processing means comprises:

second extraction means for extracting, from the single optical link, the optical measurement signal at the input of said intermediate device, said optical measurement signal being transmitted in the propagation direction;

third extraction means for extracting, from the single optical link, the optical measurement signal at the output of said intermediate device, said optical measurement signal being transmitted in the propagation direction;

delaying means arranged to delay the optical measurement signal at the output of said intermediate device, wherein the optical measurement signal extracted at input of said intermediate device and the delayed optical measurement signal extracted at output of said intermediate device are also regenerated by the regeneration means, and wherein the determination means are also arranged to obtain the delay introduced by the compensation module based on the optical measurement signal extracted at input of said intermediate device and the delayed optical measurement signal extracted at output of said intermediate device.

3. The system for determining a propagation time as claimed in claim 1, wherein the processing means comprises:

second extraction means for extracting, from the single optical link, the measurement signal at the input of said compensation module of the intermediate device, said input signal being transmitted in the propagation direction;

third extraction means for extracting, from the single optical link, the measurement signal at the output of the intermediate device, said output signal being transmitted in the propagation direction;

delaying means arranged to delay the optical measurement signal extracted at output of said intermediate device;

wherein the optical measurement signal extracted at the input of the compensation module of the intermediate device and the delayed optical measurement signal extracted at output of said intermediate device are also regenerated by the regeneration means, and wherein the determination means are also arranged to obtain the delay introduced by the compensation module based on the optical measurement signal extracted at input of the compensation module of the intermediate device and the delayed optical measurement signal extracted at output of said intermediate device.

4. The system for determining a propagation time as claimed in claim 1, wherein the processing means comprises:

drop-and-insert means, arranged to reinject at the output of said intermediate device only the optical measurement signal, the optical signals other than the optical measurement signal being reinjected at the input of said intermediate device;

switching means, placed at the input of said intermediate device, for switching an optical signal transmitted in the propagation direction, said switching means being arranged to switch the optical signal at the input to the drop-and-insert means, and wherein the determination means are also arranged to implement a first measurement, control the switching means and implement a second measurement in order to determine the delay introduced by the compensation module.

5. The system for determining a propagation time as claimed in claim 1, wherein:

said intermediate device is configured to allow a passage of an optical signal only in said compensation module, and wherein the regeneration means comprises two stages:

a first stage regenerating the extracted return optical signal, and a second stage regenerating the extracted return optical signal after the passage in said compensation module of the extracted return optical signal regenerated in the first stage.

6. The system for determining a propagation time as claimed in claim 5, wherein the regeneration means form part of another intermediate device provided for transmission of an optical signal originating from the second device to the first device by another single optical link distinct from said single optical link.

7. A drop-and-insert device, placed in an intermediate device of a system for determining a propagation time of an optical signal, wherein a first device of the system comprises transmission means for transmitting an optical measurement signal in a propagation direction to a second device of the system by a single optical link, reception means for receiving a return optical signal originating from the second device by said single optical link in the direction opposite to the propagation direction and determination means for determining said propagation time based on a moment of transmission of the measurement signal and a moment of reception of the return signal, the optical signals being transmitted by said single optical link passing through an intermediate device, which comprises at least one amplifier, arranged to amplify optical measurement signals received in the propagation direction, and a chromatic-dispersion compensation module introducing a delay, said drop-and-insert device comprising:

regeneration means for regenerating the extracted return optical signal, arranged to interact with first means for extracting from the single optical link the return optical signal at an output of said intermediate device, in order to regenerate the extracted return optical signal and to interact with means for injecting, on the single optical link in the opposite direction from the propagation direction, at the input of said intermediate device the extracted and regenerated return optical signal, and means interacting with the determination means in order to obtain a moment of reception of the return optical signal taking account of said delay introduced by said compensation module.

8. A method for determining a propagation time of an optical signal in a system comprising a first device connected to a second device with a single optical link and at least one intermediate device, through which optical signals transmitted along said single optical link pass through, said intermediate device comprising at least one amplifier, arranged to amplify optical signals received in the propagation direction, and a chromatic-dispersion compensation module introducing a delay, wherein the first device transmits an optical measurement signal in a propagation direction to the second device by said single optical link, receives a return optical signal originating from the second device by said single optical link in a direction opposite to the propagation direction and determines said propagation time based on a moment of transmission of the measurement signal and a moment of reception of the return signal, the method comprising the steps of:

extracting from the single optical link the return optical signal at an output of said intermediate device;

regenerating the extracted return optical signal;

injecting at an input of said intermediate device the extracted and regenerated return optical signal onto the single optical link in the opposite direction from the propagation direction; and obtaining a moment of reception of the return optical signal taking account of said delay introduced by said compensation module.

* * * * *